US007030050B2

(12) United States Patent
Dernovsek et al.

(10) Patent No.: US 7,030,050 B2
(45) Date of Patent: *Apr. 18, 2006

(54) GLASS CERAMIC MASS AND USE THEREOF

(75) Inventors: Oliver Dernovsek, Munich (DE); Markus Eberstein, Berlin (DE); Ulrich Fritz, Berlin (DE); Marion Gemeinert, Berlin (DE); Christina Modes, Frankfurt (DE); Gabriele Preu, Munich (DE); Wolfgang Arno Schiller, Berlin (DE); Wolfram Wersing, Bergen (DE)

(73) Assignees: Bundesanstalt fur Materialforschung und - prufung, Berlin (DE); W. C. Heraeus GmbH & Co. KG, Hanau (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/363,312

(22) PCT Filed: Aug. 31, 2001

(86) PCT No.: PCT/DE01/03340

§ 371 (c)(1),
(2), (4) Date: Aug. 8, 2003

(87) PCT Pub. No.: WO02/32824

PCT Pub. Date: Apr. 25, 2002

(65) Prior Publication Data

US 2004/0014585 A1    Jan. 22, 2004

(30) Foreign Application Priority Data

Sep. 1, 2000 (DE) ............................... 100 43 196

(51) Int. Cl.
*C04B 35/468* (2006.01)
(52) U.S. Cl. ..................................... 501/139
(58) Field of Classification Search ......... 501/137–139
See application file for complete search history.

(56) References Cited

U.S. PATENT DOCUMENTS 3,988,498 A * 10/1976 Maher ...................... 428/434
4,220,547 A *  9/1980 Abe et al. .................. 252/576
4,447,855 A    5/1984 Lagrange et al.
5,264,403 A   11/1993 Abe et al.
5,759,935 A *  6/1998 Mizutani et al. ............ 501/139
6,107,228 A *  8/2000 Sugimoto et al. ........... 501/139

FOREIGN PATENT DOCUMENTS

| DE | 100 03 264 | 8/2000 |
| EP | 0 577 067 | 1/1994 |
| EP | 0 695 724 | 2/1996 |
| JP | 08073239 | 3/1996 |

OTHER PUBLICATIONS

O. Dernovsek et al., "LTCC glass-ceramic composites for microwave application" Electroceramics VII'00, Portoroz, Slovenia, Sep. 3-6, 2000, vol. 21, No. 10-11, pp. 1693-1697, XP004301752, Journal of the European Ceramic Society, 2001, Elsevier, UK, ISSN: 0955-2219, p. 1693-1694.
David L. Wilcox et al., "The Multilayer Ceramic Integrated Circuit (MCIC) Technology: Opportunities and Challenges", pp. 17-23, 1997.

* cited by examiner

Primary Examiner—Karl Group
(74) Attorney, Agent, or Firm—Young & Thompson

(57) ABSTRACT

The invention relates to a glass ceramic mass containing at least one oxide ceramic containing barium, titanium and at least one rare earth metal Rek; and at least one glass material containing at least one oxide with boron, at least one oxide with silicon and at least one oxide with at least one bivalent metal Me2+. The glass ceramic mass is characterised in that the glass material contains at least one oxide with bismuth, especially bismuth trioxide. The oxide ceramic is especially a microwave ceramic of formula $BaRek_2Ti_4O_{12}$, Rek being neodymium or samarium. The composition of the oxide ceramic remains essentially constant during the sintering of the glass ceramic, enabling the material properties of the glass ceramic mass, such as permittivity (20–80), quality (800–5000) and Tkf (±20 ppm/K) to be specifically predetermined. The glass ceramic mass is characterised by a densification temperature of under 910° C. and can is therefore suitable for use in LTCC (low temperature cofired ceramics) technology, for integrating a passive electrical component in the volume of a multilayered ceramic body. Silver in particular can be used as an electroconductive material in this case.

14 Claims, 1 Drawing Sheet

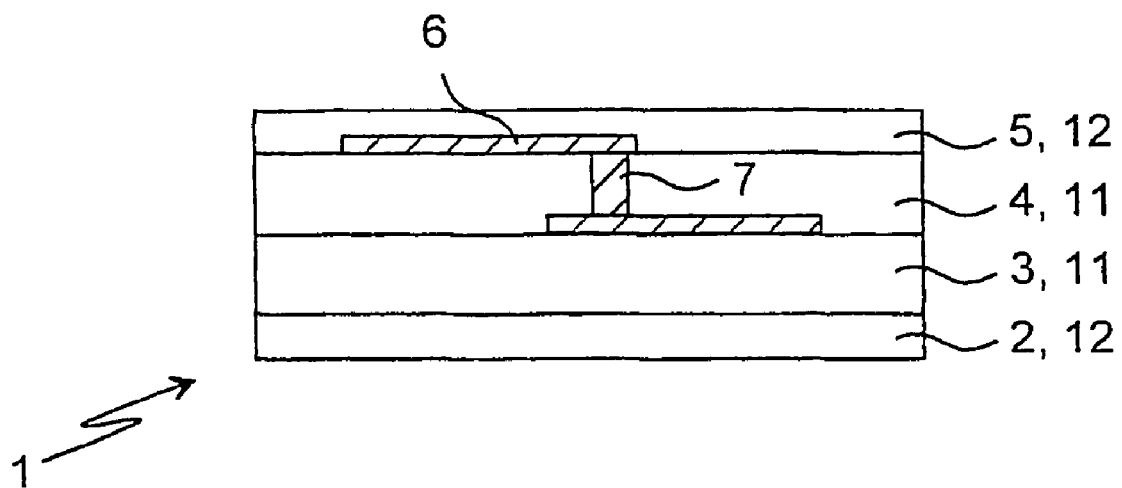
FIG

GLASS CERAMIC MASS AND USE
THEREOF

CROSS REFERENCE TO RELATED
APPLICATIONS

This is the 35USC371 national stage of international application PCT/DE01/03340 filed on Aug. 31, 2001, which designated the USA.

BACKGROUND OF THE INVENTION

The invention relates to a glass ceramic mass, comprising at least one oxide ceramic, containing barium, titanium and at least one rare earth metal Rek and at least one glass material, containing at least one oxide with boron, at least one oxide with silicon and at least one oxide with at least one bivalent metal Me2+. In addition to the glass ceramic mass, an application of the glass ceramic mass is described.

A glass ceramic mass of the aforementioned type is known from U.S. Pat. No. 5,264,403. The oxide ceramic for the known glass ceramic mass is manufactured from barium oxide (BaO), titanium dioxide ($TiO_2$), a trioxide of a rare earth metal ($Rek_2O_3$) and possibly bismuth trioxide ($Bi_2O_3$). The rare earth metal Rek is for example neodymium. The glass material in the glass ceramic mass consists of boron trioxide ($B_2O_3$), silicon dioxide and zinc oxide (ZnO). A ceramic proportion of the oxide ceramic in the glass ceramic mass is for example 90% and a glass proportion of the glass material 10%.

A compression of the glass ceramic mass occurs at a sintering temperature of about 950° C. The glass ceramic mass is thus suitable for use in LTCC (low temperature cofired ceramics) technology. The LTCC technology is described for example in D. L. Wilcox et al, Proc. 1997 ISAM, Philadelphia, pp. 17 to 23. The LTCC technology is a ceramic multilayer method in which a passive electrical component can be integrated in the volume of a ceramic multilayer body. The passive electrical component is for example an electrical conductor track, a coil, an induction or a capacitor. Integration is achieved, for example, by printing a metal structure corresponding to the component on one or more ceramic film blanks, stacking the printed ceramic film blanks above one another to form a composite and sintering the composite. Since ceramic film blanks are used with a low sintering glass ceramic mass, electrically highly conductive elementary metal Me0 with a low melting point such as silver or copper can be sintered in a composite with the ceramic film blank. In this situation, the functional integrity of the component integrated through the use of LTCC technology is crucially dependent on the dielectric material properties of the glass ceramic used. A material property of this type is for example the permittivity ($\epsilon_r$), a quality factor (Q) and a temperature coefficient of frequency (Tf value).

With regard to the known glass ceramic mass, the glass proportion is relatively low, with the result that compression of the glass ceramic mass takes places as a result of reactive liquid phase sintering. During the sintering process, a liquid glass phase (glass melt) is formed from the glass material. At a higher temperature the oxide ceramic dissolves in the glass melt until a saturation concentration is reached and a separation of the oxide ceramic occurs once again. As a result of the oxide ceramic dissolving and separating out again, the composition of the oxide ceramic and thus also the composition of the glass phase or the glass material can change. During cooling, crystallization from the glass melt can additionally occur. For example, in this situation one constituent of the oxide ceramic remains in the glass phase after cooling of the glass ceramic mass. If the composition of the oxide ceramic and thus also the composition of the glass material changes as a result of compression, it is difficult to define the material. properties of the compressed glass ceramic mass and thus to guarantee the functional integrity of the component integrated through the use of LTCC technology.

FIELD OF THE INVENTION

The object of the present invention is to specify a glass ceramic mass with an oxide ceramic, whose composition remains essentially unchanged during a sintering process.

This object is achieved by specifying a glass ceramic mass comprising at least one oxide ceramic, containing barium, titanium and at least one rare earth metal Rek and at least one glass material, containing at least one oxide with boron, at least one oxide with silicon and at least one oxide with at least one bivalent metal Me2+. The glass ceramic mass is characterized by the fact that the glass material contains at least one oxide with bismuth.

The glass ceramic mass is a glass ceramic compound and is independent of its state. The glass ceramic mass can exist as a ceramic green body. With regard to a green body, a film blank for example, a powder of the oxide ceramic and a powder of the glass material can be combined with one another by means of an organic binding agent. It is also conceivable that the glass ceramic mass can exist as a powder mixture of the oxide ceramic and the glass material. Furthermore, the glass ceramic mass can exist as a sintered ceramic body. For example, a ceramic multilayer body produced in a sintering process consists of the glass ceramic mass. This ceramic multilayer body can be submitted to a further sintering process.

The oxide ceramic can be present as a single phase. However, it can also consist of a plurality of phases. It is conceivable, for example, for the oxide ceramic to consist of phases each having a differing composition. The oxide ceramic is thus a mixture of different oxide ceramics. It is also conceivable for one or more parent compounds of an oxide ceramic to be present which are then converted to form the actual oxide ceramic only during the sintering process.

The glass material can likewise be a single phase. For example, the phase is a glass melt consisting of boron trioxide, silicon dioxide, zinc oxide and bismuth trioxide. It is also conceivable for the glass material to consist of a plurality of phases. For example, the glass material consists of a powder mixture of the specified oxides. A joint glass melt is formed from the oxides during the sintering process. It is also conceivable for the glass material to be a crystallization product of the glass melt. This means that the glass material is present not only as a glass melt after the sintering process but can also be present in a crystalline form.

The fundamental concept of the present invention consists in using a bismuth oxide, in particular bismuth trioxide, in the glass material. One advantage in doing so consists in the fact that a softening temperature $T_{soft}$ of the glass material can be lowered. The lower the glass transition point, the lower is the sintering temperature or a vitrification temperature for the corresponding glass ceramic mass. At the vitrification temperature, almost complete compression of the glass ceramic mass can be achieved in a short time.

In addition, bismuth trioxide influences the way in which the oxide ceramic dissolves and separates out again in the glass melt during the sintering process in a particularly advantageous manner (for example as a result of the lower vitrification temperature). Practically no eluation of individual components of the oxide ceramic occurs. The composition of the oxide ceramic either does not change or changes only slightly and can therefore be very well predetermined.

It is known that bismuth which is present in the oxide ceramic reacts with elementary silver at an elevated temperature. With regard to the use of an oxide ceramic containing bismuth in LTCC technology in conjunction with the use of silver as an electrically conducting material, this combination can result in an undesired reaction impairing the functional integrity of the component which is to be manufactured. If the glass material contains bismuth trioxide, the vitrification temperature is reduced. A sintering process can take place at lower temperatures. In this way, a reaction between bismuth, or bismuth trioxide, and elementary silver can be suppressed. Furthermore, if the glass proportion is relatively low, relatively little bismuth is also present, with the result that no noticeable reaction occurs between bismuth and silver.

In a special embodiment, the oxide ceramic has a formal composition $BaRek_2Ti_4O_{12}$. The oxide ceramic having the aforementioned composition is referred to as microwave ceramic since its material properties (permittivity, quality, Tf value) are very well suited for use in microwave technology.

In particular, the glass material contains at least one oxide with at least one rare earth metal Reg. The rare earth metal Reg is present for example as the trioxide $Reg_2O_3$. By using the oxide of the rare earth metal Reg, it is possible match the permittivity of the glass material, which contributes to the permittivity of the overall glass ceramic mass, to the permittivity of the oxide ceramic. A glass ceramic mass exhibiting a permittivity of 20 to 80 or even higher is thus accessible.

In particular, the rare earth metal Rek and/or the rare earth metal Reg from the group comprising lanthanum and/or neodymium and/or samarium are selected. Other lanthanides or even actinides are also conceivable. The rare earth metals Rek and Reg can be identical, but can also be different rare earth metals.

In a special embodiment, the oxide ceramic contains the bivalent metal Me2+. In particular, the bivalent metal Me2+ is selected from the group comprising beryllium, magnesium, calcium, strontium, barium, copper and/or zinc. The bivalent metal Me2+ can be present as a separate oxidic phase. In particular, the bivalent metal Me2+ is a doping of the oxide ceramic. In the oxide ceramic, the bivalent metal Me2+ causes a significant reduction in the sintering temperature of the oxide ceramic. Furthermore, it is possible to control the dielectric material properties of the oxide ceramic. For example, the oxide ceramic having the composition $BaRek_2Ti_4O_{12}$ is doped with zinc. Like the oxide of bismuth, the bivalent metal Me2+ can bring about a suppression of the eluation of individual components of the oxide ceramic during the sintering process. It has become apparent that it is particularly advantageous if the oxide ceramic is doped with the bivalent metal Me2+ which also occurs in the glass material. In particular, zinc is to be mentioned here as a bivalent metal Me2+. Zinc has a particularly advantageous effect on reactive liquid phase sintering and on any process of dissolving and separating out again which occurs in this situation.

In a further embodiment, in addition to the oxide of silicon the glass material contains as a tetravalent metal at least one oxide of at least one further tetravalent metal Me4+. In addition to the silicon dioxide, the glass material contains at least one further dioxide of a tetravalent metal. The further tetravalent metal Me4+ is selected in particular from the group comprising germanium and/or tin and/or titanium and/or zirconium. In addition to silicon dioxide, the oxides of the aforementioned tetravalent metals support a glassiness of the glass material. This means that these oxides are used, as incidentally are also the oxides of the aforementioned bivalent metals Me2+, to control a viscosity temperature characteristic of the glass material. For example, the softening temperature $T_{soft}$ of glass material can be set. Crystallization of the glass material can likewise be influenced.

In a special embodiment, 100% by volume of the glass ceramic mass is composed of a ceramic proportion of the oxide ceramic which is selected from the range between 70% by volume inclusive to 95% by volume inclusive, and a glass proportion of the glass material which is selected from the range between 30% by volume inclusive to 5% by volume inclusive. If the glass ceramic mass is subjected to a sintering process, the aforementioned reactive liquid phase sintering takes place. In the case of particularly advantageous behavior with respect to any process of dissolving and separating out again, as is the situation in particular when the bivalent metal occurs in the oxide ceramic and in the glass material, it is also possible to keep the glass proportion below 5% by volume.

In particular, the oxide ceramic and/or the glass material contain a powder with a mean particle size ($D_{50}$ value) which is selected from the range between 0.1 μm inclusive and 1.5 μm inclusive. The mean particle size is also referred to as half-value particle size. In order to maintain a very low glass proportion without restricting any process of dissolving and separating out again, powders having the specified particle sizes are particularly advantageous. The powders have a large reactive surface which is necessary for the reactive liquid phase sintering process.

Normally, in order to reduce the sintering temperature and to increase the permittivity of the glass ceramic mass, lead oxide (PbO) is added to the glass material. With regard to the present invention, the lead oxide proportion and/or cadmium oxide proportion of the glass ceramic mass and/or of the oxide ceramic and/or of the glass material is a maximum 0.1%, in particular a maximum of 1 ppm. By preference, with regard to environmental considerations, the proportion of lead oxide and cadmium oxide is almost zero. This is achieved by the present invention without significant restriction of the material properties of the glass ceramic mass.

In a special embodiment, the ceramic mass exhibits a maximum vitrification temperature of 950° C., and in particular a maximum of 910° C. or 890° C. In this situation, in particular, a glass ceramic mass is accessible with a permittivity which is selected from the range between 20 inclusive and 80 inclusive, a quality which is selected from the range between 800 inclusive and 5000 inclusive, and a Tf value which is selected from the range between −20 ppm/K inclusive and +20 ppm/K inclusive. With these material properties, the glass ceramic mass is very well suited for use in microwave technology.

According to a second aspect of the invention, a ceramic body using a previously described glass ceramic mass is specified. In particular, the ceramic body has at least one elementary metal Me0 which is selected from the group comprising gold and/or silver and/or copper. By preference, the ceramic body is a ceramic multilayer body. The previously described glass ceramic mass is used to manufacture the ceramic body. As a result of using glass material containing bismuth, vitrification of the glass ceramic mass can already take place below 890° C. With regard to a firing process in the presence of elementary silver, no disruptive interdiffusion occurs. In particular, a ceramic body in the form of a ceramic multilayer body can be manufactured in this manner. The glass ceramic mass is used in particular in ceramic film blanks in LTCC technology. In this way, glass ceramic masses are made available to the LTCC technology, having excellent material properties for the manufacture of microwave technology components.

To summarize, the following advantages result from the invention:

The composition of the oxide ceramic remains essentially constant during sintering of the glass ceramic mass. The material properties of the glass ceramic mass can thus be pre-set in a defined manner.

Almost complete compression (vitrification) of the glass ceramic mass is possible at a temperature of below 910° C., and even below 890° C.

By means of suitable (oxidic) additions to the oxide ceramic and to the glass material, the sintering behavior of the glass ceramic mass and the material properties of the glass ceramic mass can be set specifically and almost as desired. It is thus possible, for example, to set permittivity, quality and Tf value over a wide range in each case whilst retaining a low vitrification temperature.

Compression is achieved without the use of lead oxide and/or cadmium oxide.

BRIEF DESCRIPTION OF THE DRAWING

The invention will be described in the following with reference to an embodiment and the associated drawing. The drawing shows a schematic cross-section, not to scale, of a ceramic body with the glass ceramic mass in a multilayer construction.

DETAILED DESCRIPTION OF THE INVENTION

According to the embodiment, the glass ceramic mass 11 is a powder consisting of an oxide ceramic and a powder of a glass material. The oxide ceramic has the formal composition $BaRek_2Ti_4O_{12}$. The rare earth metal is neodymium. The oxide ceramic is doped with a bivalent metal Me2+ in the form of zinc. In order to manufacture the oxide ceramic, appropriate quantities of barium oxide, titanium dioxide and neodymium trioxide are mixed together with approximately one % by weight zinc oxide, calcinated or sintered, and subsequently ground to produce the corresponding powder.

The glass material contains boron, bismuth, silicon and zinc. The glass material is characterized by the following composition: 27.5 mol % boron trioxide, 34.8 mol % bismuth oxide, 32.5 mol % zinc oxide and 6 mol % silicon dioxide.

100% by volume of the glass ceramic mass is composed of 90% by volume of the ceramic material and 10% by volume of the glass material. Ceramic material and glass material have a $D_{50}$ value of 0.8 µm. The vitrification temperature of the glass ceramic mass is 900° C. The permittivity of the glass ceramic mass is 64, the quality is 820, and the Tf value is 4 ppm/K.

The glass ceramic mass 11 described is used in order to integrate a passive electrical component 6, 7 in the volume of a ceramic multilayer body 1 with the aid of LTCC technology. The ceramic multilayer body 1 produced in this manner has ceramic layers 3 and 4 which are produced from ceramic film blanks together with the glass ceramic mass 11. The ceramic layers 2 and 5 have a further glass ceramic mass 12 which is different from the glass ceramic mass 11. The electrically conductive material comprising the electronic components is an elementary metal Me0 in the form of silver.

The invention claimed is:

1. Glass ceramic mass
   comprising at least one oxide ceramic, containing barium, titanium and at least one rare earth metal Rek, and
   at least one glass material, containing at least one oxide with boron, at least one oxide with silicon and at least one oxide with at least one bivalent metal Me2+, and
   at least one oxide with bismuth,
   wherein
   a lead oxide proportion or a cadmium oxide proportion of the glass ceramic mass or of the oxide ceramic or of the glass material is a maximum 0.1%,
   wherein the glass material further contains at least one oxide with at least one rare earth metal Reg.

2. Glass ceramic mass according to claim 1, wherein the oxide ceramic has a formal composition $BaRek_2Ti_4O_{12}$.

3. Glass ceramic mass according to claim 1, wherein at least one of the rare earth metal Rek and the rare earth metal Reg is selected from the group consisting of at least one of lanthanum, neodymium and samarium.

4. Glass ceramic mass according to claim 1, wherein the oxide ceramic further contains a bivalent metal Me2+.

5. Glass ceramic mass according to claim 1, wherein a bivalent metal Me2+ is selected from the group consisting of at least one of beryllium, magnesium, calcium, strontium, barium, copper and zinc.

6. Glass ceramic mass according to claim 1, wherein in addition to the oxide of silicon the glass material contains as a tetravalent metal at least one oxide with at least one further tetravalent metal Me4+.

7. Glass ceramic mass according to claim 6, wherein the further tetravalent metal Me4+ is selected from the group consisting of at least one of germanium tin, titanium and zirconium.

8. Glass ceramic mass according to claim 1,
   wherein 100% by volume of the glass ceramic mass is composed of a ceramic proportion of the oxide ceramic which is selected from the range between 70% by volume inclusive to 95% by volume inclusive, and a glass proportion of the glass material which is selected from the range between 30% by volume inclusive to 5% by volume inclusive.

9. Glass ceramic mass according to claim 1, wherein at least one of the lead oxide proportion and the cadmium oxide proportion is a maximum of 1 ppm.

10. Glass ceramic mass according to claim 1, with a maximum vitrification temperature of 950° C.

11. Ceramic body with a glass ceramic mass according to claim 1.

12. Ceramic body according to claim 11, further comprising at least one elementary metal Me0 which is selected from the group consisting of at least one of gold, silver and copper.

13. Ceramic body according to claim 11 wherein the ceramic body is a ceramic multilayer body.

14. Glass ceramic mass according to claim 10, wherein the maximum vitrification temperature is 890° C.

* * * * *